United States Patent Office 3,419,611
Patented Dec. 31, 1968

3,419,611
HYDRATED 1,3-DIAMINOADAMANTANES AND PREPARATION THEREOF
Robert E. Moore, Wilmington, Del., assignor to Sun Oil Company, Philadelphia, Pa., a corporation of New Jersey
No Drawing. Filed Nov. 29, 1965, Ser. No. 510,353
19 Claims. (Cl. 260—563)

ABSTRACT OF THE DISCLOSURE

Derivatives of adamantane or alkyladamantanes which are 1,3-diaminoadamantanes are prepared by hydrolyzing 1,3-diformamidoadamantanes in mineral acid of 5-80% strength and recovering the resulting diamino product by raising the pH above 9 to selectively precipitate the diamine in the form of hydrates.

---

This invention relates to 1,3-diaminoadamantanes and to their preparation from corresponding 1,3 diformamidoadamantanes by a procedure including hydrolysis. The hydrocarbon moiety of the diamino products corresponds to adamantane itself or to alkyladamantanes having one or two alkyl groups attached to the adamantane nucleus.

The nucleus of adamantane (tricyclo-[3.3.1.1$^{3,7}$]-decane) contains ten carbon atoms arranged in a completely symmetrical, strainless manner such that four of the carbon atoms occupy bridgehead positions in the rings. The structure of adamantane can be depicted typographically as follows:

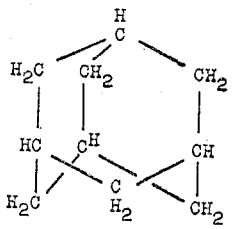

The molecule contains four tertiary hydrogen atoms attached respectively at the bridgehead carbon atoms. All four bridgehead carbons are equivalent to each other and likewise all rings are equivalent.

The 1,3-diamino compounds prepared in accordance with the invention contain an adamantane group consisting of an adamantane nucleus or an alkyladamantane moiety in which either one or two alkyl groups are attached to the adamantane nucleus either at bridgehead or non-bridgehead positions. The total number of carbon atoms in the alkyl substituent group or groups generally will not exceed 20 and preferably is in the range of 1–10 inclusive. In the present process these diamino compounds are made from diformamido compounds which correspond to the formula:

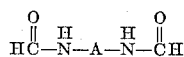

in which A represents the aforesaid adamantane or alkyladamantane group to which the two formamido substituents are attached at bridgehead positions of the nucleus. In other words these precursor compounds from which the diamino compounds are derived are the 1,3-diformamido derivatives of adamantane or the alkyladamantane hydrocarbons. Hence the amino compounds derived from these diformamido compounds are 1,3-derivatives corresponding to the formula $A(NH_2)_2$ where A is as above stated.

In the prior art adamantane itself has been converted into 1,3-diaminoadamantane by first reacting the adamantane in the presence of glacial acetic acid with concentrated nitric acid at a temperature of 120–200° C. and a pressure of 300–1000 p.s.i. to form 1,3-dinitroadamantane and then hydrogenating the latter under a hydrogen pressure in the presence of Raney nickel. Such procedure has been described in United States Patent No. 3,053,907.

The present invention provides a new route for the preparation of 1,3-diaminoadamantane as well as the 1,3-diamino derivatives of alkyladamantanes having one or two alkyl groups containing up to twenty and preferably from one to ten total carbon atoms. This new route does not necessitate the use of either high pressures or high temperatures as is required in the prior art procedure referred to above. In the preferred procedure for practicing the invention the 1,3-diamino compounds unexpectedly are produced in the novel form of hydrates. These hydrates at room temperature may be crystalline or may appear as oils, depending upon the size and arrangement of alkyl groups on the adamantane nucleus. If desired, the anhydrous diamines can be obtained therefrom by driving out the water under evaporating conditions.

The diformamido precursor compounds used for preparing the 1,3-diamino products of the invention can be prepared from adamantane diols or alkyladamantane diols in which the two hydroxy groups are attached to the adamantane nucleus at either bridgehead or non-bridgehead positions or both. A procedure for doing this is described and claimed in Schneider and Moore United States application Ser. No. 450,016, filed Apr. 22, 1965. The diformamido precursors can also be prepared from dibromo or dichloro derivatives of adamantane or alkyladamantanes in which the two halogen atoms are attached to the adamantane nucleus at either bridgehead or non-bridgehead positions or both, as described and claimed in Moore United States application Ser. No. 450,169, filed Apr. 22, 1965. In either of these procedures the difunctional adamantane charge material (i.e., the diol or dihalo compound) is dissolved in strong sulfuric acid, preferably fuming sulfuric acid having a strength of 102–105% $H_2SO_4$ equivalent by weight, and the mixture is reacted with hydrogen cyanide. The mixture is then diluted with water, preferably supplied in the form of cracked ice, whereupon the 1,3-diformamido compound is formed. This product may or may not precipitate from the reaction mixture depending upon the number of carbon atoms in alkyl group or groups attached to the adamantane nucleus. With a large number of alkyl carbon atoms the diformamido product will precipitate from the diluted sulfuric acid solution and can be recovered by filtration. On the other hand, when A in the above formulas corresponds to adamantane or when only a few alkyl carbon atoms are present, the diformamido product will be soluble in the diluted acid and will remain in solution. If desired, it can be recovered therefrom by extraction with a suitable solvent such as benzene or ether. However, for the present purpose this is not necessary and the aqueous acid solution of the diformamido product preferably is directly used for preparing the 1,3-diamino product according to the invention.

The types of reactions which occur in the foregoing procedures for making the diformamido compound can be illustrated by means of the following equation which shows what occurs in reacting 1,3-dihydroxy-5,7-dimethyladamantane with hydrogen cyanide.

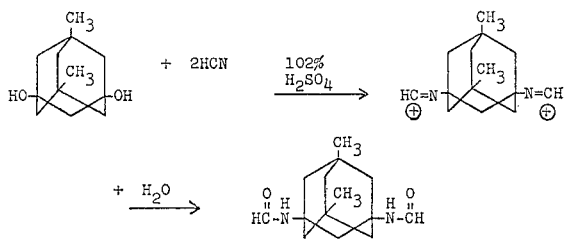

As indicated the hydrogen cyanide reacts at each site of the hydroxyl groups by what appears to be a carbonium ion mechanism and apparently produces at each site an intermediate $$-\overset{\oplus}{N}=CH$$

carbonium ion group. In this initial reaction the hydroxyl groups become bound or taken up by the strong sulfuric acid in some manner. In order to obtain the diformamido product it is essential to dilute the acid solution with a large amount of water in order to allow solvolysis to proceed to form the two amido groups. When the reaction mixture is diluted with sufficient water, the 1,3-diformamido-5,7-dimethyladamantane is formed but remains in solution.

As another specific example of preparing the diamido precursor, 1,4-dichloro-5-methyl-7-ethyladamantane is reacted in the presence of fuming sulfuric acid with hydrogen cyanide generated in situ by addition of NaCN to a solution of the dichloro compound dissolved in fuming acid. The mixture is then diluted with water and 1,3-diformamido-5-methyl-7-ethyladamantane is produced. Again the diamido product is soluble in the aqueous sulfuric acid and does not precipitate.

As indicated above, the dihydroxy, dibromo or dichloro adamantane compound used for preparing the precursors from which the products of the present invention are made need not originally contain the substituent groups at bridgehead positions in order to result in 1,3-diformamido products. This is due to the fact that the strong sulfuric acid used to effect the conversion also will cause isomerization to a bridgehead position of any hydroxyl or halogen group originally attached to a nonbridgehead carbon. Hence, when such substituent undergoes reaction with HCN and solvolysis takes place upon subsequent dilution with water, the resulting formamido substituents will be located at bridgehead carbon atoms. The product thus will have formamido groups at the 1- and 3-positions. This is illustrated by the second example given above.

For the present purpose 1,3-diformamidoadamantane compounds obtained as above described or obtained in any other suitable manner can be used. These precursors can be a 1,3-diformamido derivative of adamantane itself or of any alkyladamantane having attached to the adamantane nucleus 1–2 alkyl groups containing 1–20, preferably 1–10, total carbon atoms. The alkyl groups can be attached to bridgehead and/or nonbridgehead carbon atoms of the nucleus. Examples of such reactants are the 1,3-diformamido derivatives of the following hydrocarbons: adamantane; 1-methyl or 2-methyladamantane; 1-ethyl or 2-ethyladamantane; 1,2-dimethyl or 1,3-dimethyladamantane; 1-methyl-3-ethyladamantane; diethyladamantanes; 1-n-propyl or 1-isopropyladamantane; 1-n-butyladamantane; 1,3 - di-n-pentyladamantane; 1 - methyl-3-heptyladamantane; 1-n-decyladamantane; 1,3-di-n-decyladamantane; and 1-ethyl-3-n-octadecyladamantane. Preferred diformamido compounds for the present purpose and their corresponding diamino products are those in which the hydrocarbon moieties correspond to dimethyladamantane; ethyladamantane and methylethyladamantane, especially with the alkyl groups being at bridgehead positions on the adamantane nucleus.

According to the present invention, a mixture is formed of a 1,3-diformamido adamantane compound as above specified and an aqueous mineral acid having a strength in the range of 5–80% by weight of the acid. Preferably the acid is sulfuric acid having a strength of 20–60% $H_2SO_4$ by weight. However, other mineral acids, such as hydrochloric acid, phosphoric acid or the like, are suitable. The function of the acid is to catalyze hydrolysis of the diformamido compound. The mixture is heated to a temperature at which hydrolysis occurs and such temperature is maintained until the diformamido compound has substantially all hydrolyzed by substitution of hydrogen for each acyl radical $$(-\overset{O}{\overset{\|}{C}}-H)$$

A temperature generally in the range of 60–175° C. is used and preferably the hydrolysis temperature is in the range of 100–150° C. Usually the hydrolysis is effected merely by refluxing the acidic mixture until the hydrolysis reaction is complete. Times in the range of 0.5–12 hours are typical.

It should be noted that the diamidoadamantane compound which is hydrolyzed in accordance with the invention is specifically a diformamidoadamantane or alkyladamantane. Compounds in which the two amido groups are other than formamido are not suitable for practicing the invention for the reason that they will not undergo hydrolysis in the desired manner. For example, if 1,3-diacetamidoadamantane is used, it will hydrolyze to only a minor extent, whereas 1,3-diformamidoadamantane under the same conditions will hydrolyze substantially completely. This is in contrast to the monoacetamidoadamantanes, which, unlike the disubstituted compounds, can readily be hydrolyzed. Accordingly, for the present purpose of making diamines, it is essential that the diformamido compounds be used.

The reaction that occurs in the hydrolysis step can be illustrated in the case of diformamidoadamantane by the following equation:

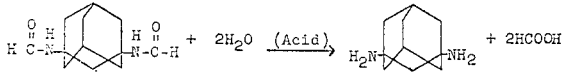

It can be seen that this hydrolysis converts each formamido group into an amino group and that the acyl radical converts to formic acid. In some circumstances carbon monoxide and water may be formed instead of formic acid. While the equation shows 1,3-diaminoadamantane as product, at this stage the diamine actually is in the form of a salt with the mineral acid used as catalyst for the reaction. In cases where hydrochloric acid has been used to effect the hydrolysis, the diamine can be recovered in the form of its hydrochloride salt merely by evaporating the water and excess HCl. When a relatively non-volatile acid, such as sulfuric or phosphoric acid, has been employed, recovery of the diamine preferably is done by the precipitation procedure described below. The latter procedure also is applicable where HCl has been used to effect the hydrolysis.

In the preferred procedure for recovering the diamine product, the acidic hydrolyzed mixture is reacted with an alkali metal alkaline reagent, preferably caustic soda, in amount not only to neutralize all of the mineral acid in the mixture but also to raise the pH of the mixture to above 9. Preferably enough alkaline reagent is used to adjust the pH to within the range of 10–12. Upon conversion of the mixture to such high pH, the 1,3-diaminoadamantane product is obtained as a precipitate if the temperature of the mixture is not too high. Surprisingly, this precipitate has been found to be a hydrated form of the 1,3-diamino compound. The hydrate is obtained as either a white crystalline product or as a light amber colored oil, depending upon whether the temperature is below or above the melting point of the hydrate product. This product has distinctly different characteristics from the corresponding non-hydrated diamine as hereinafter discussed.

After the reaction mixture has been alkalinized to a pH above 9 and preferably to 10–12, the mixture is maintained at a temperature at which the hydrated 1,3-diamino product precipitates. The precipitated product can then be recovered from the reaction mixture by filtration, decantation or the like. Generally a temperature in the range of 20–75° C. is used. If the temperature is above the melting point of the hydrate, the product will precipitate as an oily liquid. Preferably a sufficiently low temperature is used so that the hydrate will be obtained in the form of a solid crystalline powder, as a more complete precipitation of the diamine is generally obtained than when precipitation is effected above the melting point. However, since the alkaline agent also neutralizes the mineral acid to form an inorganic salt, the temperature should not be too low as otherwise the salt will also crystallize from the mixture along with the diamine and present a difficult purification problem. The temperature at which such salt contamination may occur depends upon the concentration of mineral acid used as catalyst for the hydrolysis reaction and the particular mineral acid employed. Under the preferred conditions wherein sulfuric acid having a strength of 20–60% $H_2SO_4$ is used, it is best to effect the diamine precipitation at a temperature of 30–45° C. This will allow precipitation of the diamine to occur without simultaneously causing precipitation of sodium sulfate.

The hydrated diamine products obtained as precipitates by the foregoing procedure have distinctly different characteristics from the corresponding diamines. The hydrated compounds characteristically have higher melting points and much lower solubilities in common solvents than the anhydrous diamines. The hydrate product as obtained from the process does not appear to be a single hydrated compound but rather a series of compounds having varying ratios of $(ANH_2)_2$ to $H_2O$. Such product melts over a substantial temperature range (e.g., 5–10° C. temperature spread) and individual crystals can be observed under the microscope to melt at different points in the range. The melting range, however, is distinctly higher than the temperature at which the corresponding anhydrous product melts.

The hydrate product can readily be converted to the anhydrous diamine by evaporation of water. This can be done by heating the hydrate to a sufficient temperature to drive out the water or merely by contacting the crystalline hydrate at room temperaure with a dry inert gas for sufficient time.

By way of example, anhydrous 1,3-diamino-5,7-dimethyl-adamantane melts at about 44° C. whereas the hydrate thereof obtained by the precipitation procedure described above melts mainly through the range of 53–60° C. Different melting point ranges for the hydrate products will be obtained for other diamines prepared according to the invention, depending upon the particular alkyl substitution of the adamantane nucleus. Such melting points tend to be lower as the number of total substituent carbon atoms increases. Also the melting points depend upon the degree of molecular symmetry of the compounds, being lower as the compounds become more unsymmetrical. Melting points for the anhydrous diamines vary similarly but are substantially below the values for the corresponding hydrates.

There is a marked difference between the anhydrous diamines and their hydrates with respect to solubility in common solvents. For example, 1,3-diamino-5,7-dimethyladamantane has good solubility in ethyl ether or benzene whereas the corresponding hydrated material is substantially insoluble in either of these solvents. This insolubility characteristic of the hydrated product is fortuitous and can be utilized advantageously in practicing the present invention to obtain diamine product of high purity in the event that the hydrolysis of the diformamido compound has not proceeded to completion. In the work up of the hydrolyzed mixture, any unreacted diformamido compound will precipitate along with the diamine hydrate when the pH is raised by addition of caustic soda as above specified. This unreacted diformamido compound has solubility characteristics similar to those for the anhydrous diamine and would be difficult to separate therefrom if the process had yielded the diamine in non-hydrated form. Fortunately, however, the precipitated diamine is in the unexpected hydrate form which is substantially insoluble in solvents such as diethyl ether or benzene, so that the unreacted formamide can readily be extracted therefrom to give substantially pure diamine hydrate. The latter can then be dehydrated to yield the adamantane or alkyladamantane diamine in highly pure form. Thus the hydrate products have special utility in the preparation of the corresponding pure anhydrous diamines which in turn are useful for preparing polymers of the polyamide type.

The following example illustrates the invention:

EXAMPLE

In this example 1,3-dihydroxy-5,7-dimethyladamantane was first converted to the corresponding 1,3-diformamido compound, the latter was hydrolyzed and the hydrated diamine was precipitated from the hydrolysis product. Specifically, 200 ml. of fuming sulfuric acid (10% oleum; 102.25% $H_2SO_4$ equivalent) were cooled to 15° C. and 25 g. (0.1275 mole) of 1,3-dihydroxy-5,7-dimethyladamantane were slowly added while stirring. The resulting solution was agitated vigorously and sodium cyanide in amount of 25.5 g. (0.52 mole) was added slowly thereto over a period of 2 hours. Temperature was maintained at 15–25° C. and the mixture was stirred additionally for one hour. It was then poured over cracked ice in amount such that, after the ice had melted, the acid strength was about 40% $H_2SO_4$ by weight. This procedure resulted in a solution of the 1,3-diformamido compound. The solution was then refluxed for about 7 hours to assure complete conversion of the formamido groups to amino groups by hydrolysis. As the mixture was cooling caustic soda was added with continued stirring until the pH had reached a level of about 11. This caused precipitation of hydrated diamino product. The temperature was adjusted to 30–40° C. and the mixture was filtered to give 30 g. of white crystalline residue. This material had a melting point range of 53–60° C. and was substantially insoluble at room temperature in benzene and in ethyl ether. Spectrographic analyses by near I.R., N.M.R. and X-ray diffraction showed that the product was composed of 1,3-diamine hydrates of dimethyladamantane. Formamido groups could not be detected in the product, showing that the hydrolysis reaction had been complete. Elemental analysis of the hydrated diamine product corresponded to the empirical formula $C_{12}H_{22}N_2 \cdot 2.36H_2O$. This product was distilled under reduced pressure measured as 0.3 mm. Hg absolute at a point beyond the Dry Ice trap. First the water vaporized and passed from the system. The resulting anhydrous diamine boiled at 77° C. under the reduced pressure employed and 23 g. of pure anhydrous product were collected as distillate. This corresponded to a yield of 94% of theoretical based on the 1,3-diol charged. A small amount of inorganic residue containing no adamantane nuclei and not otherwise identified was left in the distillation flask.

The foregoing example shows that good yields of highly pure diamino product can be obtained in practicing the invention. Analogous results are obtained when other diformamido compounds are made and hydrolyzed as herein described. The hydrolysis takes place in similar manner when other mineral acids of strength as herein stated are substituted for sulfuric acid. When the hydrocarbon moiety of the diformamido precursor compound corresponds to adamantane or to any of the other alkyladamantanes as herein specified, analogous hydrated diamine products are obtained in practicing the procedure.

These can be subjected to distillation in similar fashion to obtain the pure anhydrous diamine product.

I claim:
1. A hydrate of a 1,3-diaminoadamantane compound having the formula $A(NH_2)_2$ wherein A is a hydrocarbon group corresponding to adamantane or alkyladamantanes having attached to the adamantane nucleus 1–2 alkyl groups containing 1–20 total carbon atoms.
2. A hydrate according to claim 1 wherein A corresponds to an alkyladamantane having 1–10 total alkyl carbon atoms.
3. A hydrate according to claim 2 wherein A corresponds to dimethyladamantane.
4. A hydrate according to claim 2 wherein A corresponds to ethyladamantane.
5. A hydrate according to claim 2 wherein A corresponds to methylethyladamantane.
6. Method of preparing a 1,3-diaminoadamantane compound which comprises heating a 1,3-diformamidoadamantane compound corresponding to the formula:

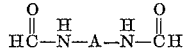

wherein A is a hydrocarbon group having an adamantane nucleus to which the formamido substituents are attached at bridgehead positions, in admixture with an aqueous mineral acid having a strength in the range of 5–80% by weight of the acid to a temperature in the range of 60–175° C. at which hydrolysis occurs, maintaining such temperature until said 1,3-diformamido compound has substantially all hydrolyzed by substitution of hydrogen for each acyl group, reacting the hydrolyzed mixture with an alkali metal hydroxide in amount to raise the pH to at least about 9, maintaining the resulting mixture at a temperature at which a hydrated 1,3-diaminoadamantane compound precipitates, and separating said hydrated compound from the mixture.
7. Method according to claim 6 wherein said mineral acid is sulfuric acid containing 20–60% $H_2SO_4$ by weight.
8. Method according to claim 7 wherein the hydrolysis temperature is in the range of 100–150° C., said hydroxide is used in amount to raise the pH to 10–12 and the last-mentioned temperature is in the range of 30–45° C.
9. Method according to claim 6 wherein the hydrolysis temperature is in the range of 100–150° C.
10. Method according to claim 6 wherein said hydroxide is used in amount to raise the pH to 10–12.
11. Method according to claim 6 wherein the last-mentioned temperature is in the range of 20–75° C.
12. Method according to claim 6 additionally comprising dehydrating said hydrated compound by evaporation of water to yield a 1,3-diamino compound of the formula $A(NH_2)_2$.
13. Method according to claim 6 wherein said 1,3-diformamido compound is 1,3-diformamido-5,7-dimethyladamantane.
14. Method according to claim 6 wherein said 1,3-diformamido compound is 1,3-diformamido-5-methyl-7-ethyladamantane.
15. Method according to claim 6 wherein said 1,3-diformamido compound is 1,3-diformamido-5-ethyladamantane.
16. Method of preparing a 1,3-diaminoadamantane compound which comprises heating 1,3-diformamido-5,7-dimethyladamantane in admixture with aqueous sulfuric acid having a strength of 5–80% $H_2SO_4$ by weight to a temperature within the range of 60–175° C., maintaining such temperature until the diformamido compound has substantially all hydrolyzed by substitution of a hydrogen atom for each acyl group, reacting the hydrolyzed mixture with an alkali metal hydroxide in amount to raise the pH to above 9, maintaining the resulting mixture at a temperature at which a hydrated 1,3-diamino-5,7-dimethyladamantane precipitates, and recovering the precipitated hydrated compound from the mixture.
17. Method according to claim 16 additionally comprising evaporating water from said hydrated compound to yield anhydrous 1,3-diamino-5,7-dimethyladamantane.
18. Method according to claim 16 wherein said strength is 20–60% $H_2SO_4$ by weight, the first-mentioned temperature is in the range of 100–150° C. and said hydroxide is used in amount to raise the pH to 10–12.
19. Method according to claim 18 wherein the last-mentioned temperature is in the range of 30–45° C.

References Cited

UNITED STATES PATENTS 3,347,919  10/1967  Martin _____ 260—563

OTHER REFERENCES

Wagner et al.: Syn. Org. Chem., 1953, p. 678.

CHARLES B. PARKER, *Primary Examiner.*

PATRICIA C. IVES, *Assistant Examiner.*

U.S. Cl. X.R.

260—557, 566